United States Patent [19]
Suda et al.

[11] Patent Number: 5,212,833
[45] Date of Patent: May 18, 1993

[54] MICROCOMPUTER CONTROLLED SYNTHESIZER-TYPE RADIO RECEIVER

[75] Inventors: Kazuyuki Suda; Akio Araki, Chiba; Toshio Asai, Tokyo, all of Japan

[73] Assignee: Sony Corporation, Tokyo, Japan

[21] Appl. No.: 577,640

[22] Filed: Sep. 5, 1990

[30] Foreign Application Priority Data

Sep. 13, 1989 [JP] Japan .................................. 1-237624

[51] Int. Cl.⁵ .......................................... H04B 15/00
[52] U.S. Cl. .................................. 455/183.2; 455/316; 455/317; 381/81
[58] Field of Search ............... 455/132, 133, 183, 260, 455/316, 317, 2, 4; 381/81

[56] References Cited

U.S. PATENT DOCUMENTS

| | | | |
|---|---|---|---|
| 4,545,072 | 10/1985 | Skutta et al. | 455/183 |
| 4,816,774 | 3/1989 | Martin | 455/260 |
| 4,905,305 | 2/1990 | Garner et al. | 455/183 |
| 4,907,079 | 3/1990 | Turner et al. | 455/2 |

FOREIGN PATENT DOCUMENTS

2194696 3/1988 United Kingdom .

Primary Examiner—Curtis Kuntz
Assistant Examiner—Timothy H. Keough
Attorney, Agent, or Firm—William S. Frommer; Alvin Sinderbrand

[57] ABSTRACT

An electronic apparatus includes at least a receiver having a synthesizer section for selecting a receiving frequency and providing an information signal corresponding to the selected receiving frequency, a microcomputer operating on a clock signal for controlling the synthesizer section, and a circuit responsive to the information signal for shifting the clock frequency when the selected receiving frequency is a frequency disturbed by a higher harmonic of the clock frequency, thereby to avoid disturbance of reception of the broadcast signal without requiring undue reduction of the clock frequency.

7 Claims, 2 Drawing Sheets

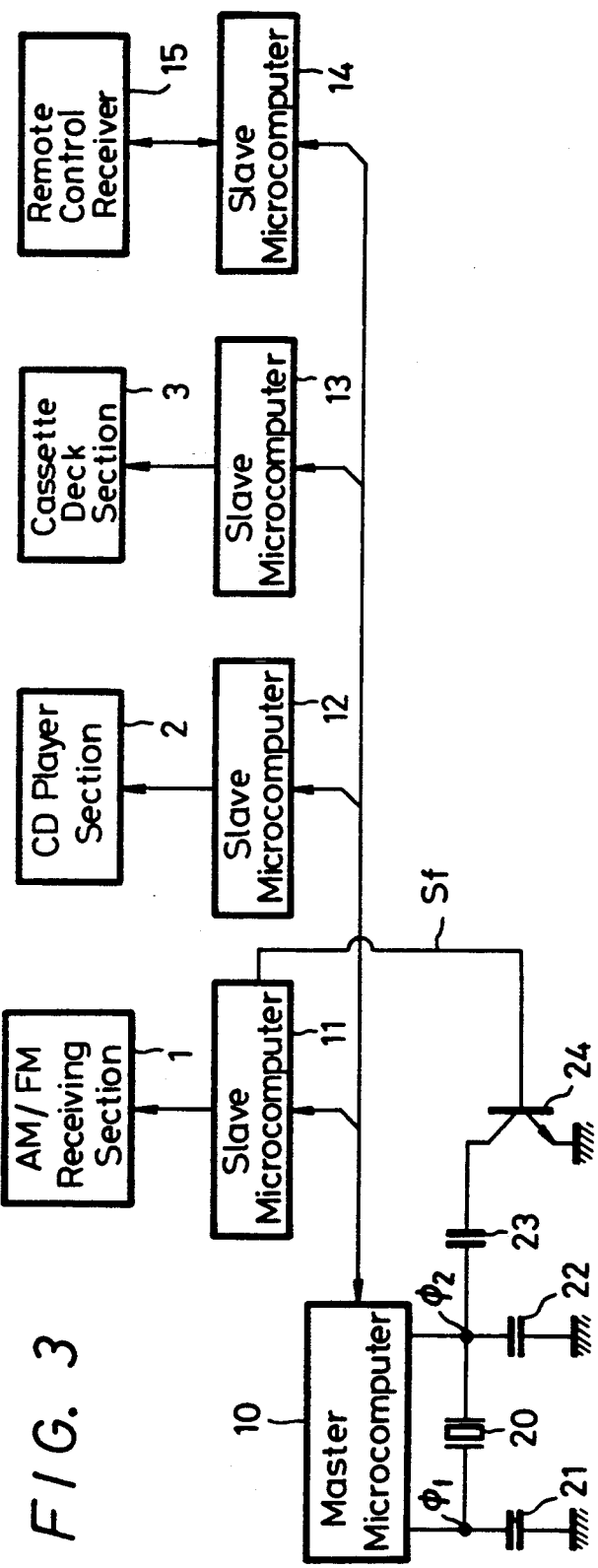
FIG. 3
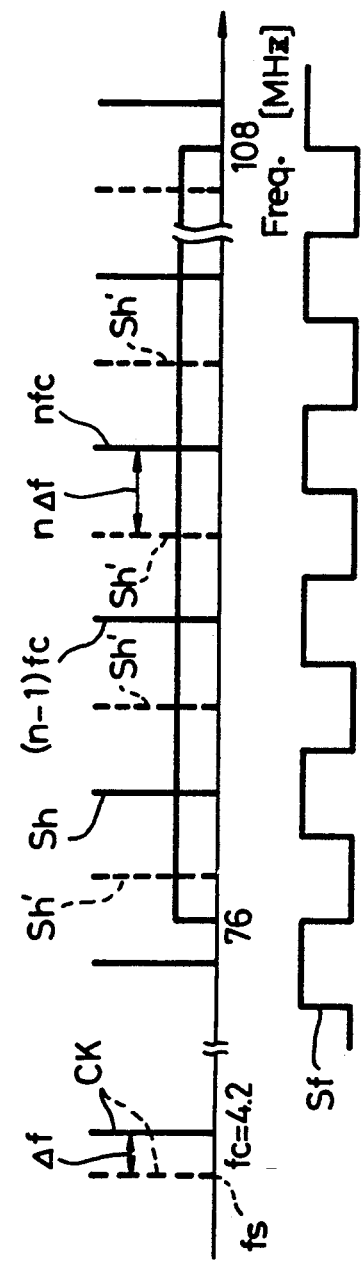
FIG. 4A
FIG. 4B

MICROCOMPUTER CONTROLLED SYNTHESIZER-TYPE RADIO RECEIVER

BACKGROUND OF THE INVENTION

1. Field of the Invention

The present invention relates generally to radio receivers and, more particularly, is directed to electronic apparatus having a synthesizer-type receiver which is preferably combined with a cassette type tape player and/or a compact disk (CD) player in a unitary assembly.

2. Description of the Prior Art

It is known to provide, in a unitary assembly, an AM/FM radio receiver with a cassette tape player and/or a CD player, and in which the AM/FM receiver, the cassette tape player and the CD player are independently controlled by respective micro-computers.

It is also known to employ an AM/FM receiver of the synthesizer-type in such unitary assembly. For example, as shown in FIG. 1, a known electronic apparatus comprises, in a unitary assembly, an AM/FM receiving section 1 of the synthesizer-type, a CD player section 2, a cassette tape player or deck section 3, a main or master micro-computer 10, slave micro-computers 11, 12 and 13 for controlling the AM/FM receiver section 1, the CD player section 2 and the cassette tape player section 3, respectively and an additional slave micro-computer 14 for processing control signals supplied from or to a remote control receiver 15 and transmitted from or to a remote commander (not shown). The AM/FM receiver section 1 of the synthesizer-type conventionally includes a phase locked loop (PLL) in which a frequency-dividing ratio signal from the micro-computer 11 determines the dividing ratio of a variable frequency-dividing circuit (not shown) in the PLL and thereby determines the receiving frequency of the receiver section 1.

The micro-computers 11–14 may each be constituted by a 4-bit single chip-type micro-computer, and are all controlled or commanded by the main computer 10. When the operations of the receiver section 1, the CD player section 2, the tape cassette player section 3 and the remote control receiver 15 are controlled by the micro-computers 11, 12, 13 and 14, respectively, and such micro-computers 11–14 are controlled by the main micro-computer 10, the software programs in the micro-computers 11–14 can be easily developed so as to enable the sections 1, 2 and 3 to perform numerous operations and functions. In a practical example of the prior art arrangement illustrated in FIG. 1, the main micro-computer 10 is a micro-processor obtainable from the NEC Corporation under the designation D 753284GC, the micro-computer 11 is a micro-processor also obtainable from the NEC Corporation under the designation D 1715G, the micro-computer 12 is obtainable from Sony Corporation under the designation CXP 5078, the micro-computer 13 is also obtainable from Sony Corporation under the designation CXP 5024, and the micro-computer 14 is obtainable from Mitsubishi Electric Corporation under the designation M 50920.

It will be appreciated that a clock signal is required for operation of each of the micro-computers 10–14. If the clock signal CK for the main micro-computer 10 has a relatively high clock frequency fc, for example, of 4.2 MHz, then as shown in FIG. 2A, higher harmonic components Sh of the clock signal CK are distributed within the FM broadcasting frequency band of 76 to 108 MHz. As a result, when the receiver section 1 is operative to receive a FM signal broadcast at a frequency that is equal to one of the higher harmonics Sh of the clock frequency fc, the reception of such broadcast signal is disturbed.

In order to avoid the above problem, it has been suggested, for example, as shown on FIG. 2B, that the frequency fc of the clock signal CK be decreased to approximately the lowest frequency at which the main computer 10 can be operated, for example, to a frequency of 400 kHz, so that the order of the higher harmonic components Sh of the clock signal CK distributed within the FM broadcasting band is substantially higher than the order of the higher harmonic components within the FM broadcasting band in FIG. 2A. By reason of the foregoing, when the frequency fc of the clock signal CK of the main micro-computer 10 is decreased to about 400 kHz, the level of the higher harmonic components Sh of such clock signal within the FM broadcasting band is so small as to be negligible. More specifically, in the case illustrated in FIG. 2A, the higher harmonic components Sh of the clock signal CK distributed in the FM broadcasting band when the clock frequency fc is 4.2 MHz are in the range from the 19th order to the 24th order, and at least some of the levels thereof are of sufficient magnitude to produce the undesired disturbance of the FM reception. On the other hand, in the case illustrated in FIG. 2B, and in which the frequency fc of the clock signal CK is decreased to 400 kHz, the higher harmonic components Sh of the clock signal CK distributed within the FM broadcasting band are from the 190th order to the 270th order. When the higher harmonic components Sh of the clock signal CK within the FM broadcasting band range from the 190th order to the 270th order, the levels of such higher harmonic components are, as shown, so small as to be satisfactorily neglected and to ensure that reception of the FM broadcast signal will be undisturbed. When the frequency of the clock signal CK for the main computer 10 is reduced as described above for avoiding disturbance of the reception of the FM broadcast signal by the higher harmonic components of such clock signal, the frequencies of the clock signals employed in the micro-computers 11–14 will be similarly decreased for the same reason.

Of course, if low clock frequencies are used in the micro-computers 10–14, as described above, the processing speeds of the micro-computers 10–14 are correspondingly lowered. Since the micro-computers 11–14 are employed for independently controlling the respective sections 1, 2 and 3 and remote control receiver 15, such computers do not need to operate at high speed. Therefore, the clock frequencies of the micro-computers 11–14 can be reduced, as described above, to ensure that the higher harmonic components of the clock signals employed in the microcomputers 11–14 have negligible levels.

However, the main micro-computer 10 exerts overall system control of the electronic apparatus and the micro-computers 11–14 are, in turn, operated under the control of the main micro-computer 10 so that, if the frequency fc of the clock signal CK of the main micro-computer 10 is lowered, for example, to 400 kHz, as described above, the correspondingly lowered processing speed of the main micro-computer 10 reduces the range of operations of the receiver section 1, the CD player section 2, the tape cassette player section 3 and the remote control receiver 15 can be controlled by the main computer. For example, in the case where audio levels are displayed, the reduced processing speed of the main micro-computer 10 will introduce a time delay in the audio level display. Thus, the audio level indication will not correspond to real time conditions.

OBJECTS AND SUMMARY OF THE INVENTION

Accordingly, it is an object of the present invention to provide an electronic apparatus which includes a synthesizer-type receiver, and which eliminates the above mentioned problems and disadvantages inherent in the prior art.

More specifically, it is an object of the present invention to provide an electronic apparatus including a synthesizer-type receiver which can prevent disturbance of the reception of an FM broadcast signal by higher harmonic components of a clock signal employed in a micro-computer for controlling the receiver.

It is another object of the present invention to provide an electronic apparatus including a synthesizer-type receiver, as aforesaid, and which further includes a CD player and/or a cassette tape player in a unitary assembly therewith.

It is still another object of the present invention to provide an electronic apparatus including a synthesizer-type receiver, as aforesaid, controlled by a micro-computer, and in which disturbance of the reception of FM broadcast signals by higher harmonic components of a clock signal for operating the micro-computer is avoided without reducing the clock frequency to an extent that would unduly limit the operations of the apparatus controllable by the micro-computer.

It is a further object of the present invention to provide an electronic apparatus including a synthesizer-type receiver, as aforesaid, and which can be produced at relatively low cost.

In accordance with an aspect of this invention, an electronic apparatus comprises a synthesizer-type receiver for selecting a receiving frequency and receiving a signal broadcast at the selected receiving frequency and mean for deriving an information signal which corresponds to the selected receiving frequency; control means operable on the basis of a clock signal for controlling operations of at least the synthesizer-type receiver; and clock generating means for providing the clock signal including means responsive to the information signal for shifting the frequency of the clock signal on the basis of such information signal when the selected receiving frequency of the synthesizer-type receiver is a frequency disturbed by a higher harmonic component of the clock signal or of a frequency divided version of the clock signal.

The above, and other objects, features and advantages of the present invention, will be apparent in the following detailed description of a preferred embodiment of the invention which is to be read in conjunction with the accompanying drawings forming a part hereof, and in which corresponding parts or components are identified by the same reference numerals in the several views of the drawings.

BRIEF DESCRIPTION OF THE DRAWINGS

FIG. 3 is a schematic block diagram showing an electronic apparatus similar to that of FIG. 1, but incorporating an embodiment of the present invention; and FIGS. 4A and 4B are graphs of frequency characteristics to which reference will be made in explaining the operation of the embodiment of the invention illustrated in FIG. 3.

DETAILED DESCRIPTION OF A PREFERRED EMBODIMENT

Figure 1:
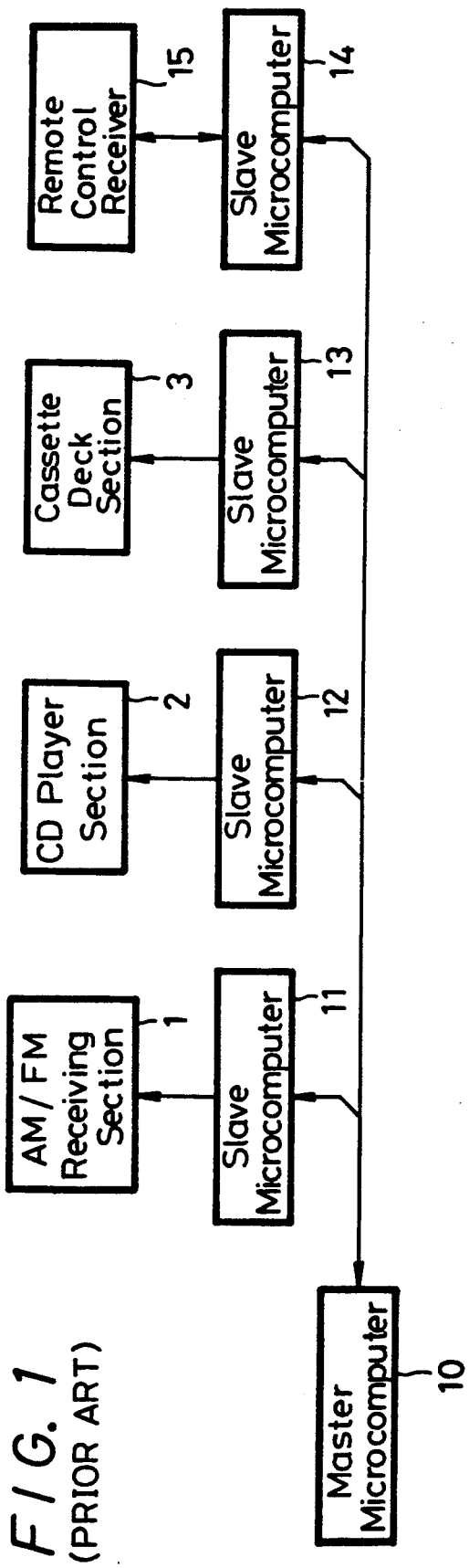
FIG. 1 is a schematic block diagram of an electronic apparatus according to the prior art which includes a synthesizer-type AM/FM receiver along with a CD player and a cassette tape player in a unitary assembly capable of remote control.
Figure 2A:
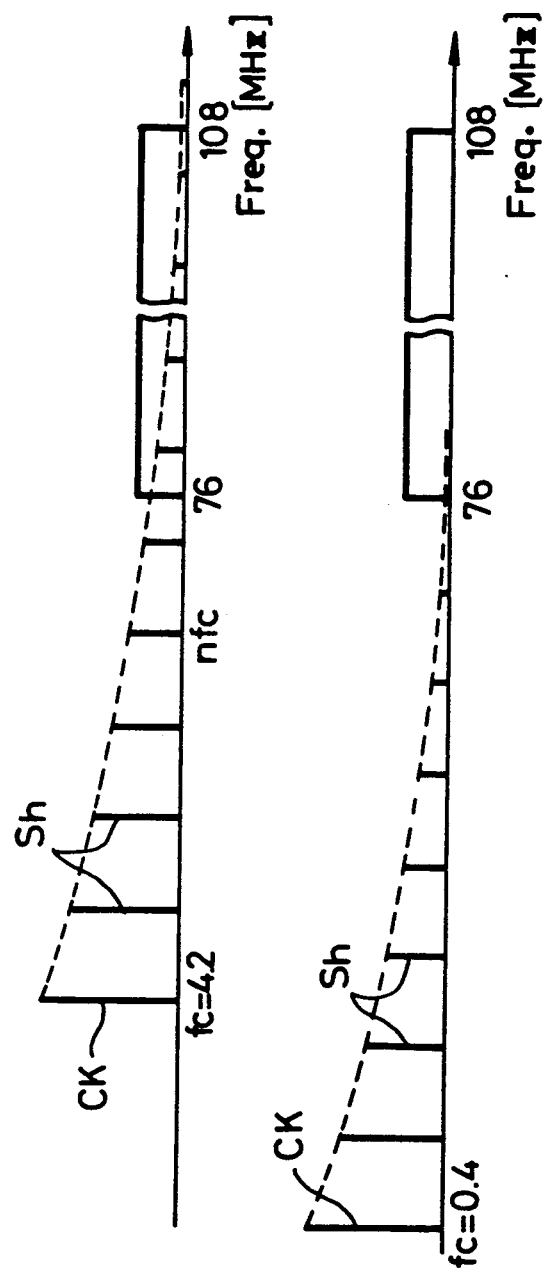
FIGS. 2A and 2B are graphs of frequency characteristics to which reference is made in explaining problems encountered with the electronic apparatus of FIG. 1 and a modification thereof.
Figure 2B:
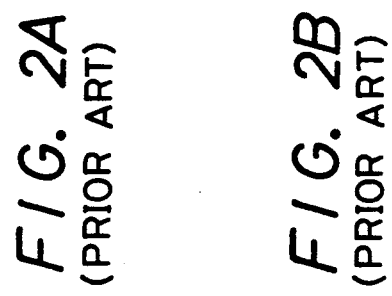

Referring now to FIG. 3, it will be seen that many parts of the electronic apparatus embodying the present invention, as there illustrated, are identified by the same reference numerals as were used to identify the corresponding parts in the apparatus of FIG. 1 and will not be again described in detail.

In the embodiment of the invention illustrated in FIG. 3, the main or master micro-computer 10 has a clock oscillator circuit by which the clock signal for the master computer 10 is generated, for example, with a frequency fc of 4.2 MHz. Such clock oscillator circuit for the master micro-computer 10 is shown to have a ceramic oscillator 20 for oscillating a clock signal which is connected between clock terminals $\phi_1$ and $\phi_2$ of the main micro-computer 10, and capacitors 21 and 22 respectively connected between clock terminal $\phi_1$ and ground and between clock terminal $\phi_2$ and ground. Further, in accordance with the illustrated embodiment of the invention, a capacitor 23 and a collector-emitter path of an npn transistor 24 are connected in series between the clock terminal $\phi_2$ and ground.

The oscillation frequency fc of the ceramic oscillator 20 is selected to achieve a suitably high processing speed of the main micro-computer 10, for example, the oscillation frequency of the ceramic oscillator 20 is selected to be 4.2 MHz. When the transistor 24 is turned ON, the capacitor 23 is connected in parallel with the capacitor 22 whereby the clock frequency fc of the main micro-computer 10 is shifted by an amount $\Delta f$ in the lower direction. The amount $\Delta f$ that the clock frequency fc is shifted when the transistor 24 is turned ON is determined as follows:

If it is assumed that n represents the order of the higher harmonic component Sh of the clock frequency fc which is situated in the FM broadcasting band, then a frequency fi centered between the (n-1)th order higher harmonic component Sh and the frequency of the nth order higher harmonic component Sh can be expressed as in the below equation (1):

$$fi = [n - (\tfrac{1}{2})]FC \tag{1}$$

Accordingly, the frequency fs of a fundamental wave signal of which the frequency fi is the nth order higher harmonic component can be expressed as:

$$fs = fi/n$$

or ps
$$fs = fc - fc/(2n) \tag{2}$$

The difference between the frequency fs and the clock frequency fc represents the amount of the frequency shift Δf, and is expressed as:

$$\Delta f = fc - fs$$

$$\Delta f = fc/(2n) \quad (3)$$

In other words, if the amount of the frequency shift Δf is selected in accordance with equation (3) above, then the higher harmonic components Sh' of the shifted clock frequency fs (indicated in dash lines on FIG. 4A) are located midway between the higher harmonic components Sh of the original clock frequency fc (shown in solid lines in FIG. 4A).

If, for example, the higher harmonic components Sh of the original frequency fc that lie within the FM broadcasting band range from the 19th order harmonic component to the 25th order harmonic component, that is, n=19 to 25, an average value of n, that is, n=22, may be adopted for the sake of simplicity in determining the value of Δf. Substituting n=22 in the above equation (3) yields:

$$\Delta = fc/(2 \times 22) = fc/44$$

In other words, when fc=4.2 MHz, then Δf approximately equals 95 kHz.

Therefore, in the embodiment of the present invention being here described, the capacitance of the capacitor 23 is selected so that, when the transistor 24 is turned ON, the frequency of the clock signal is shifted downwardly by the amount Δf≈95 kHz.

Further, in the electronic apparatus according to this invention, as illustrated in FIG. 3, the micro-computer 11 associated with the synthesizer-type AM/FM receiver 1 is operative to provide an information signal Sf (FIG. 4B) which is related to the receiving frequency fr selected by the synthesizer-type receiver 1 as will now be described.

More specifically, the signal Sf from the micro-computer 11 is at the high level "1" so long as the selected receiving frequency fr satisfies the below inequality:

$$\underline{n}\,(fc - \Delta f/2) < fr < \underline{n}\,(fc + \Delta f/2) \quad (4)$$

At all other times, that is, whenever the selected receiving frequency fr does not satisfy the inequality 4), the signal Sf is at the low level "0".

Since the micro-computer 11 provides to the synthesizer-type receiver 1 the frequency-dividing ratio for determining the selected receiving frequency-dividing ratio for determining the selected receiving frequency fr of the receiver, the micro-computer 11 can readily determine whether or not the frequency-dividing ratio corresponds to the inequality (4) and provide the signal Sf accordingly.

Finally, as shown in FIG. 3, the signal Sf from the micro-computer 11 is applied to the base of the transistor 24 so that the latter is turned ON when the signal Sf is "1" for shifting the clock frequency by the amount Δf, whereas, at all other times, that is, so long as the signal Sf is "0", the clock frequency remains at its normal value fc.

It will be appreciated that, when an FM broadcast signal is received at a selected receiving frequency fr which does not satisfy the inequality (4), so that the information signal Sf is "0" and the transistor 24 is turned OFF with the result that the clock frequency fc of the main micro-computer 10 is maintained at the original frequency of 4.2 MHz, the higher harmonic components Sh of the clock signal CK do not disturb the reception of such FM broadcast signal.

On the other hand, when an FM broadcast signal is received with a selected receiving frequency fr which satisfies the inequality (4), so that Sf is "1" and the transistor 24 is turned ON, the capacitor 23 is thereby connected in parallel with the capacitor 22 with the result that the clock frequency fc of the main micro-computer 10 is shifted downwardly from the original frequency 4.2 MHz by the amount Δf≈95 kHz to the lower frequency fs.

When the clock frequency fs is determined as described above, then the higher harmonic components Sh' thereof (shown in dotted lines on FIG. 4A) are shifted from the frequency n·fc (MHz) of the higher harmonic components Sh (shown by solid lines) of the original clock signal CK by the frequency n·Δf kHz with the result that the shifted higher harmonic components Sh' do not disturb the FM broadcast signal being received at that time.

It will be appreciated from the above that, in accordance with the present invention, when an FM broadcast signal is received by the synthesizer-type receiver 1, the clock frequency fc of the master micro-computer 10 is shifted when required in response to the selected receiving frequency fr so that the reception of the FM broadcast signal will not, in any case, be disturbed by the higher harmonic components of the clock signal CK. Furthermore, since the clock frequency fc of the master micro-computer 10 is either the original frequency of 4.2 MHz or is equal to that frequency reduced by 95 kHz, it will be appreciated that the master micro-computer 10 is operating, at all times, with a clock of substantially high frequency, and thus can perform the necessary processing at a sufficiently high speed. Therefore, the illustrated electronic apparatus comprising an AM/FM receiver 1, a CD player 2 and a tape cassette player 3 can be operated in a wide variety of operating modes under the control of the master micro-computer 10.

If an error exists in the ceramic oscillator 20 or in the capacitors 21 and 22 so that the clock frequency fc deviates from the desired value of 4.2 MHz, there is a similar variation or deviation of the frequencies of the higher harmonic components Sh of the clock frequency. However, in accordance with the present invention, when the clock frequency fc is shifted by the amount Δf, the higher harmonic components Sh' of the shifted clock frequency fs are each situated substantially midway between adjacent higher harmonic components Sh (shown by the solid lines on FIG. 4A) of the original clock frequency fc. Thus, even if the clock frequency fc fluctuates or deviates, when an FM broadcast signal is received at the selected receiving frequency fr which is situated, in the FM broadcast band, adjacent one of the higher harmonic components Sh, the shift of the clock frequency by the amount Δf will still result in the shifted higher harmonic components Sh' being substantially spaced from the receiving frequency fr so that the FM broadcast signal will not be disturbed by the higher harmonic components Sh'.

It will be appreciated that in accordance with the present invention, as described above, the only elements necessarily added to the prior art shown in FIG. 1 are the capacitor 23 and the npn transistor 24 associated with the clock oscillator circuit. Therefore, a synthesizer-type receiver having the described advantages of the present invention can be provided at little extra cost.

Although the previously described embodiment of the invention is intended to avoid disturbance of the received FM broadcast signal by the higher harmonic components Sh of the clock signal CK itself having the clock frequency fc, the invention can be similarly applied to avoiding disturbance of an FM broadcast signal by higher harmonic components of a frequency-divided pulse signal having a frequency of 2.1 MHz, and which results from frequency-dividing by two the clock signal CK within the main micro-computer 10. In such case, as before, the clock frequency fc is shifted in response to the receiving frequency fr being near to a higher harmonic component of the frequency-divided pulse signal, with the result that such higher harmonic component of the frequency-divided pulse signal is shifted away from the receiving frequency fr.

Further, although the present invention has been described as applied to an electronic apparatus in which a synthesizer-type AM/FM radio receiver is combined with a cassette tape player and a CD player in a unitary assembly, it will be appreciated that the invention is not limited thereto and can be similarly applied to the combination of a synthesizer-type AM/FM radio receiver with either a cassette tape player or a CD player, or merely to the synthesizer-type AM/FM radio receiver in which only one microcomputer is utilized. Furthermore, the present invention can be similarly employed in a syntnesizer-type TV tuner for shifting the clock frequency fc and thereby ensuring that higher harmonic components of the clock signal will not disturb a received broadcast television signal.

Having described a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An electronic apparatus comprising:
   receiver means having a synthesizer section for selecting a receiving frequency within a predetermined frequency band and receiving a signal broadcast at the selected receiving frequency, said receiver means providing an information signal corresponding to said selected receiving frequency;
   control means operable on the basis of a clock signal having a respective frequency and higher order harmonic components thereof for controlling operation of at least said synthesizer section of said receiver means; and
   clock generating means for providing said clock signal, said clock generating means including an oscillator having a predetermined oscillating frequency to which said frequency of said clock signal corresponds and means responsive to said information signal for shifting the frequency of said clock signal by an amount $\Delta f = fc/2n$, where fc is the frequency of said clock signal and n is the average of the orders of the higher harmonic components of said clock signal within said predetermined frequency band so as to shift each higher harmonic component of said clock signal or of a frequency-divided version of said clock signal substantially one-half the frequency difference between the higher harmonic components of said clock signal when said selected receiving frequency is a frequency disturbed by at least one of said higher harmonic components of said clock signal or of said frequency-divided version of said clock signal.

2. An electronic apparatus as in claim 1; further comprising at least one additional section controllable by said control means on the basis of said clock means and being selected from compact disc player means, cassette tape player means and remote control means.

3. An electronic apparatus as in claim 2; in which said control means includes a microcomputer.

4. An electronic apparatus as in claim 1; in which said oscillator is connected between clock terminals of said clock generating means, said clock generating means further includes first and second capacitors connected between said clock terminals and ground, and said means for shifting the frequency of said clock signal includes a third capacitor connected from one of said clock terminals to ground through a transistor which is turned ON by said information signal.

5. An electronic apparatus as in claim 1; in which said means for shifting the frequency of said clock signal by said amount $\Delta f$ is operative when the selected receiving frequency fr satisfies the below inequality:

$$(\bar{n} fc = \Delta f/2) < fr < \underline{n} (fc + \Delta f/2).$$

6. An electronic apparatus as in claim 7; in which said oscillator is normally oscillating at said frequency of the clock signal; and said means for shifting the clock signal includes a capacitor dimensioned to shift said clock signal frequency by said amount $\Delta f$ when connected between said oscillator and ground, and transistor means for connecting said capacitor to ground when turned ON by said information signal.

7. An electronic apparatus as in claim 6; in which said transistor means is an npn transistor having a collector-emitter path to which said capacitor is connected, said information signal is connected to the base of said transistor to turn ON the latter only when said information signal is at a high level, and said information signal is at said high level only when said selected receiving frequency satisfies said inequality.

* * * * *